United States Patent [19]
Nickerson et al.

[11] 3,899,594
[45] Aug. 12, 1975

[54] FOOD PRESERVATION

[75] Inventors: John T. R. Nickerson, Somerville; John R. Darack, Framingham, both of Mass.

[73] Assignee: Dirigo Corporation, Boston, Mass.

[22] Filed: Mar. 29, 1974

[21] Appl. No.: 456,181

Related U.S. Application Data

[63] Continuation of Ser. No. 180,099, Sept. 13, 1971, abandoned.

[52] U.S. Cl. .............. 426/9; 426/43; 426/52; 426/56; 426/321; 426/59; 426/332; 426/335
[51] Int. Cl.² ... A23L 1/31; A23B 1/00; A23B 7/00; A23L 3/00
[58] Field of Search ............... 426/9, 52, 55, 59, 56, 426/43, 7, 321, 335

[56] References Cited
UNITED STATES PATENTS 2,225,783   12/1940   Jensen et al. ..................... 426/59
3,022,176   2/1962    Lawrence et al. ................. 426/9
3,323,921   6/1967    Moseley et al. ................... 426/43
3,561,977   2/1971    Rothchild et al. ................. 426/59

OTHER PUBLICATIONS

Reddy et al., Inhibitory Action of Lactic Cultures of Gram–Negative Bacteria in Ground Meat, Chemical Abstracts, Vol. 74, 1971, (98361U), QD1A51.

Primary Examiner—David M. Naff
Attorney, Agent, or Firm—Joseph Zallen

[57] ABSTRACT

The storage life of food is extended and food which should be discarded is detected by adding to food a preservative composition containing an inoculum of *Pediococcus cerevisiae* or *Lactobacillus viridescens* and a combination of a sorbic acid salt and a propionic acid salt. The inoculum grows in the presence of the sorbic acid and propionic acid salts which inhibit undesirable food bacteria, and after growing to a certain point produces an undesirable flavor in the food causing the food to be discarded.

3 Claims, No Drawings

FOOD PRESERVATION

This is a continuation of our co-pending application of the same title, Ser. No. 180,099, filed Sept. 13, 1971 now abandoned.

BACKGROUND OF INVENTION

This invention relates to a method of safely extending the storage life of foods, particularly those susceptible to contamination and spoilage, as for example, chicken salad, custal filled foods and fish fillets. In particular, this invention relates to a method for treating such foods so as to not only extend the storage life but also inhibit the growth of common, food-borne disease organisms, as for example, Staphylococcus and Salmonella species.

It should be noted that while this invention relates principly to easily spoiled foods as above, it is not intended for use with cultured food products such as creamed cottage cheese, cultured buttermilk, yogurt and the like. Such cultured food products are intended and do contain a substantial microbiologica population when sold and present entirely different problems with respect to contamination and spoilage.

The food products with which the present invention is primarily concerned are very susceptible to both the growth of spoilage organisms and the growth of food-borne disease organisms. Thus, it has heretofore been exceedingly difficult to handle in a satisfactory commercial manner such products as custard pies, eclairs, battered fish fillets, potato salad, egg salad, cooked lobster meat, cooked peeled shrimp, chicken salad, crab meat salad and tuna salad because of rapid spoilage even when under refrigeration. Part of the problems with regard to such foods has been the difficulty in proper initial handling of the foods and the growth of food-borne disease organisms and spoilage organisms through many sequences in the cycle of preparation and storage. Further, it is difficult with respect to such foods to provide any microbial reducing treatment, as for example, sterilization or pasturization, without seriously impairing the flavor or texture of the food.

Proposals have been made in the past for treating food with non-toxic acidic chemicals which metabolize readily. Thus, in U.S. Pat. No. 2,711,976, amino acids such as glycine or serine are suggested to increase the resistance of custard foods to spoilage organisms and Staphylococcus. U.S. Pat. No. 2,898,372, suggests calcium acetate propionate to reduce the mold in bread. U.S. Pat. No. 2,866,819 refers to the use of sorbic acid as a fungistat and preservative in foods generally. U.S. Pat. No. 2,910,368, discloses the use of EDTA with sorbic acid to increase the shelf life of vegetable salads containing an acidic edible dressing. U.S. Pat. No. 2,992,114 suggests sorbic acid and mild heat treatment for the preservation of fruit and vegetables. U.S. Pat. No. 3,021,219 proposes sorbic acid to prevent mold in bread.

In a paper published in "Applied Microbiology," Volume 18, pages 68-75 (July, 1969), Preonas et al reported on the use of a mixture of sorbic acid and propionic acid to retard the growth of *Staphylococcus aureus* on the top and cut surfaces of Southern Custard Pies. Although some retardation was found, it was noted that inhibition was affected by the moisture gradient so that the package would require refrigeration after opening. Further, there was evidence of mold formation after nine days. HOwever, such prior art chemicals, used as described, could extend the storage life of the foods so as to permit growth of Clostridium.

One object of the present invention is to provide a novel method of safely extending the storage life of foods.

A further object of this invention is to provide such a method which is particularly adapted to foods highly susceptible to contamination and spoilage.

Another object of this invention is to provide such a method which concurrently inhibits the growth of common food-borne disease organisms.

A further object of this invention is to provide a preservative material for safely extending the storage life of foods.

Another object of this invention is to provide such a preservative material which also inhibits the growth of common disease-born organisms.

Other objects and advantages of this invention will be apparent from the description and claims which follow.

SUMMARY OF INVENTION

The present invention comprises broadly, the method of treating a food product with both an inoculum of a benign organism, which is a non-pathogenic member of the Lactobacteriaceae, and an organic acid or salt thereof which has selective bacteriostatic activity. The method is characterized in that common, food-borne disease organisms and many distasteful spoilage organisms are inhibited, but the inoculum grows. After a finite period of extension of the normal storage life, the inoculum has grown to a point where it now causes an undesirable flavor in the food, causing it to be discarded.

Among the bacteria which can be used for the inoculum are those such as *Pediococcus cerevisiae*, which normally grow in food in a temperature range of 40° to 86°F. Other suitable organisms include *Lactobacillus viridescens*. It should be noted that there are certain species in the Lactobacteriaceae family which normally do not grow below about 50°F and hence would not be suitable in this invention for products which would normally be stored under refrigeration. Cultures for the above-identified organisms are available from collections maintained for such purposes, as for example, American Type Culture Collection of Rockville, Maryland.

The bacteriostatic organic acid is preferably selected from those which are active with only minimal effect on flavor and which inhibit spoilage and food-borne disease organisms at 40° to 80°F but do not inhibit the inoculum. We have found that a mixture of sorbic acid with potassium or sodium propionate provides such selective inhibition with minimum effect on flavor, thus inhibiting salmonellae, *Staphylococcus aureus* and spoilage organisms, but permitting the growth of the inoculum.

Among the products which are particularly benefited by the method and products of this invention are custard type foods such as custard pies, eclairs, Boston cream pies, squash pies, salads, such as chicken salad, egg salad, potato salad, tuna salad, crab meat salad, ham salad, lobster salad, shrimp salad and fish fillets. In the past, many of these food products have been implicated in the transmission of food-borne diseases of salmonellae or *Staphylococcus aureus* origin.

The chemical mixture and inoculum can be added separately to the food product or may be added together. In addition to an inoculum consisting of a single organism, the inoculum can be a combination of two or more non-pathogenic members of the Lactobacteriaceae characterized as growing in food in the temperature range of approximately 40° to 86°F.

The percentages of sorbic acid (or its salts) and propionic acid (or its salts) that are useful in this invention are generally quite small. Larger amounts can be used but do add little to their effectiveness in this invention. Thus, sorbic acid is effective in a concentration as low as about 0.10%. It is preferred that the sorbic acid be used in a concentration of about 0.15%, which approximates its solubility in water. If a salt of sorbic acid is used, as for example sodium or potassium sorbate, slightly higher concentrations should be used.

With respect to propionic acid, a propionate salt is preferred over the acid because of better odor or flavor. Sodium propionate and calcium propionate are effective in concentrations as low as about 0.10%. It is preferred that the propionate be used in a concentration of about 0.45% so that the preferred combination is 0.15% sorbic acid and 0.45% sodium propionate.

SPECIFIC EXAMPLES OF INVENTION

In the following Examples 1– 7 the term "chemical mixture" is used to define a mixture of one part sorbic acid and three parts sodium propionate: the term "inoculum" is used to mean "*Pediococcus cerevisiae*'-'ATCC8042 in the proportion of 0.1 gram of the dried culture per pound of chemical mixture. Unless otherwise specified, the chemical mixture was added in such proportions to provide a concentration of approximately 0.15% sorbic acid and 0.45% sodium propionate in the particular food product.

EXAMPLE 1

Custard filling from fresh, commercially purchased vanilla eclairs was mixed with *Staphylococcus aureus* (Type B–2) and separated into separate portions. One portion received no further treatment. Another portion was treated with the chemical mixture. Each portion was examined for its count of enterotoxic staphylococci. The portions were then both incubated for 2 days at 86°F. After this incubation, organoleptic observations and counts for enterotoxic staphylococci were made on all samples.

The portion that was not treated increased its Staphylococci count one thousandfold and had a medicinal odor. The treated portion had about the same staphylococci count as it did initially and the normal vanilla odor and flavor.

EXAMPLE 1 A

Example 1 was repeated, this time incubating at 40°F. The untreated portion spoiled in 7 days while that treated with the chemical mixture was still satisfactory after 7 days.

Example 1 B

Example 1 was repeated, this time incorporating the inoculum. The product spoiled in 14 days due to the growth of both spoilage-type bacteria and the *Pediococcus cerevisiae*.

EXAMPLE 2

Freshly prepared chicken salad was inoculated with *Salmonella typhimurium*. One portion was left untreated and the other treated with the chemical mixture. Counts were made for Salmonella on both portions and then the samples were incubated for 2 days at 86°F.

The untreated portion was putrid and had a Salmonella count 10 times as high as initially. The treated portion had a normal odor and a slight decrease in Salmonella count.

EXAMPLE 3

In a variation of Example 2, the treated and untreated portions were incubated for ten days at about 40°F, with spoilage type bacteria counts made before and after. The untreated samples increased their count of spoilage bacteria 1 thousandfold while the treated sample did not increase and in some instances slightly decreased its count.

EXAMPLE 4

In another variation of Example 2, inoculum of *Pediococcus cerevisiae* was added to the portion treated with the chemical mixture. The samples were incubated for 4 days at 75°F. The untreated samples were putrid while the treated samples were only very slightly putrid with a substantial increase in *Pediococcus cerevisiae*.

EXAMPLE 5

Breaded fish fillets were divided into two portions. One portion was untreated while the surface of the other portion was treated with chemical mixture and inoculum. The storage life of the treated fillets at 40°F was approximately 10 days beyond that of the untreated portion. At the time of spoilage of the treated sample, one-third of the bacteria present were of the ordinary spoilage type while two-thirds were *Pediococcus cerevisiae*.

EXAMPLE 6

A combination of the chemical mixture and the inoculum was packaged together in moisture-proof containers. Some containers were incubated at about 72°F for 4 weeks while others were incubated at 40°F for about 4 weeks. In both cases there was significant survival of *Pediococcus cerevisiae*. In the case of the 40°F sample, there were substantially no decrease in the count of Pediococcus cerevisiae.

EXAMPLE 7

Following the techniques of Example 1 addition of the inoculum and chemical mixture to chicken salad containing *Salmonella typhimurium* was found to extend the safe storage life to 14 days at 40°F, the growth being principally spoilage-type bacteria and *Pediococcus cerevisiae*.

EXAMPLE 8

The filling from a number of eclairs was placed in an electric blender, inoculated with a culture of *Lactobacillus viridescens* (ATCC 12706), and mixed. Plate cultures were prepared with APT agar and incubated anaerobically at 75°F (23.9°C) for 5 days to determine the count of lactobacilli.

Portion A was removed to a sterile beaker and held for 24 hours at 86°F (30 C) and Portion B removed to a sterile petri dish, and held for 14 days at 40°F (4.4 C) after which counts were made for lactobacilli as indicated above.

The weight of the remaining eclair material in the blender was then determined and 0.15% of sorbic acid and 0.45% of sodium propionate were added and mixed.

Portion C was removed to a sterile beaker and held for 24 hours at 86°F and Portion D removed to a sterile petri dish and held for 14 days at 40°F, after which counts for lactobacilli were made, as indicated above.

The filling from a number of eclairs was placed in a blender, inoculated with a culture of *Pediococcus cereivisiae* (ATCC 8042), and mixed. Plate cultures were prepared with APT agar and incubated anaerobically at 75°F for 5 days to determine the count of pediococci.

Portion E was removed to a sterile beaker, and held at 86°F for 24 hours, and Portion F removed to a sterile petri dish and held at 40°F for 14 days after which counts for pediococci was made as indicated above.

The weight of the remaining elcair material was determined and 0.15% of sorbic acid and 0.45% of sodium propionate were added and mixed.

Portion G was removed to a sterile beaker and held for 24 hours art 86°F and Portion H removed to a sterile petri dish and held at 40°F for 14 days, after which counts were made for pediococci as indicated above.

EXAMPLE 9

A quantity of chicken salad was placed in a blender, inoculated with a culture of *Lactobacillus viridescens* (ATCC 12706), and mixed. Plate cultures were prepared with APT agar and incubated anaerobically at 75°F for 5 days to determine the count of lactobacilli.

Portion I was removed to a sterile beaker and held at 86°F for 24 hours and Portion J removed to a sterile petri dish and held at 40°F for 14 days, after which counts were made as indicated above to determine the number of lactobacilli.

The weight of the remaining chicken salad was determined and 0.15% of sorbic acid and 0.45% of sodium propionate were added and mixed.

Portion K was removed to a sterile beaker and held for 24 hours at 86°F, and Portion L removed to a sterile petri dish and held at 40°F for 14 days, after which counts were made, as indicated above, to determine the number of lactobacilli.

EXAMPLE 10

A portion of chicken salad was added to a blender. A culture of *Pediococcus cerivisiae* (ATCC 8042) was added and mixed. Plate cultures were prepared with APT agar and incubated anaerobically for 5 days at 75°F to determine the count of pediococci.

Portion M was removed to a sterile beaker and held for 24 hours at 86°F and Portion N removed to a sterile petri dish and held for 14 days at 40°F, after which counts were made as indicated above to determine the number of pediococci. The weight of the remaining chicken salad was determined and 0.15% of sorbic acid and 0.45% of sodium propionate were added and mixed.

Portion O was removed to a sterile beaker and incubated at 86°F for 24 hours and Portion P removed to a sterile petri dish and placed at 40°F for 14 days, after which counts were made to determine the number of pediococci, as indicated above.

The results of Examples 8, 9 and 10 are shown in Table 1. The data shows that both *Lactobacillus viridescens* and *Pediococcus cerevisiae* grow in custard filling or chicken salad in the temperature range of about 40° to 86°F. Both grow well even in the presence of the chemical mixture at 86°F but somewhat slower at 40°F. Nevertheless, the growth at 40°F is sufficient to cause spoilage after a reasonable extension of storage life.

Table 1

| Sample code | Material and Treatment | Time and Temp. of incubation | Count per gram (Ave. of 2 plates) |
|---|---|---|---|
| none | custard with *L. viridescens* | none | 5,800,000 |
| none | custard with *P. cerivisae* | none | 6,400,000 |
| none | chicken with *L. viridescens* | none | 16,000,000 |
| none | chicken with *P. cerivisae* | none | 18,000,000 |
| A | custard with *L. viridescene* | 24 hours at 86 F | 620,000,000 |
| C | custard with *L. viridescens* plus chemicals | 24 hours at 86 F | 600,000,000 |
| B | custard with *L. viridescens* | 14 days at 40 F | 700,000,000 |
| D | custard with *L. viridescens* plus chemicals | 14 days at 40 F | 130,000,000 |
| E | custard with *P. cerivisae* | 24 hours at 86 F | 780,000,000 |
| G | custard with *P. cerivisae* plus chemicals | 24 hours at 86 F | 620,000,000 |
| F | custard with *P. cerivisae* | 14 days at 40 F | 780,000,000 |
| H | custard with *P. cerivisae* plus chemicals | 14 days at 40 F | 140,000,000 |
| I | chicken with *L. viridescens* | 24 hours at 86 F | 370,000,000 |
| K | chicken with *L. viridescens* plus chemicals | 24 hours at 86 F | 410,000,000 |
| J | chicken with *L. viridescens* | 14 days at 40 F | 1,100,000,000 |
| L | chicken with *L. viridescens* plus chemicals | 14 days at 40 F | 510,000,000 |
| M | chicken with *P. cerivisae* | 24 hours at 86 F | 400,000,000 |
| O | chicken with *P. cerivisae* plus chemicals | 24 hours at 86 F | 460,000,000 |
| N | chicken with *P. cerivisae* | 14 days at 40 F | 1,100,000,000 |
| P | chicken with *P. cerivisae* plus chemicals | 14 days at 40 F | 450,000,000 |

We claim:

1. A method for safely extending the storage life of foods normally highly susceptible to common food-borne disease and common spoilage organisms selected from the group of foods consisting of custard filled foods, eclairs, fish fillets, potato salad, egg salad, cooked lobster meat, cooked peeled shrimp, chicken salad, squash pies, ham salad, lobster salad, shrimp salad, crab meat salad, and tuna salad, which method comprises adding to the food the combination of a composition which inhibits the growth of organisms and an inoculum, and permitting the inoculum to grow for a finite period of time until it causes an undesirable flavor in the food, thus causing the food to be discarded; said compound comprising an organic acid or salt thereof which inhibits the growth of common food-borne disease and spoilage organisms in the temperature range of approximately 40° to 86° F., but only slightly inhibits the growth of the inoculum at such temperatures; the inoculum being a non-pathogenic member of the Lactobacteriaceae which is characterized as growing in food in the temperature range of approximately 40° to 86° F.; said inoculum being either *Pediococcus cerevisiae* or *Lactobacillus viridescens* and said organic acid being a mixture of sorbic acid compound with propionate compound; said sorbic acid compound being either sorbic acid, potassium sorbate or sodium sorabte and said propionate compound being either sodium, calcium or potassium propionate; each said compound being present in said food at a concentration of at least 0.01%.

2. The method of claim 1 wherein the inoculum is *Pediococcus cerevisiae*.

3. The method of claim 1 whrein the inoculum is *Lactobacillus viridescens*.

* * * * *

UNITED STATES PATENT OFFICE
CERTIFICATE OF CORRECTION

Patent No. 3,899,594          Dated August 12, 1975

Inventor(s) John T. R. Nickerson and John R. Darack

It is certified that error appears in the above-identified patent and that said Letters Patent are hereby corrected as shown below:

In Column 1, Line 11, change "custal" to "custard" and in Line 22 change "microbiologica" to "microbiological". In Column 2, Line 18, change "disease-born" to "food-borne".

In Claim 1, Line 14, change "compound" to "composition"; in Line 27 change "sorabte" to "sorbate" and in Line 30 change "0.01%" to "0.10%"

In the Abstract, Line 5 "a sorbic acid salt" should read "sorbic acid or a sorbic acid salt".

Signed and Sealed this eleventh Day of November 1975

[SEAL]

Attest:

RUTH C. MASON
Attesting Officer

C. MARSHALL DANN
Commissioner of Patents and Trademarks